(12) United States Patent
Sasai

(10) Patent No.: US 6,296,523 B1
(45) Date of Patent: Oct. 2, 2001

(54) MALE AND FEMALE CONNECTOR PAIR AND SET OF MATING CONNECTORS

(75) Inventor: Osamu Sasai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/300,504

(22) Filed: Apr. 28, 1999

(30) Foreign Application Priority Data

Apr. 28, 1998 (JP) ................................................. 10-118513
Jun. 8, 1998 (JP) ................................................. 10-159290

(51) Int. Cl.$^7$ ............................ H01R 24/00; H01R 33/00
(52) U.S. Cl. ............................................. 439/660; 439/608
(58) Field of Search ................................... 439/660, 608, 439/609, 941, 335

(56) References Cited

U.S. PATENT DOCUMENTS

| | | |
|---|---|---|
| 5,660,782 | 8/1997 | Davis . |
| 5,709,831 | 1/1998 | Endo et al. . |
| 5,814,356 | 9/1998 | Ito et al. . |
| 5,861,120 | 1/1999 | Yagi et al. . |
| 5,915,760 | 6/1999 | Kawase et al. . |
| 6,024,552 | 2/2000 | Wada et al. . |
| 6,045,739 | 4/2000 | Abe . |

FOREIGN PATENT DOCUMENTS

| | | |
|---|---|---|
| 36 01 115 | 7/1987 | (DE) . |
| 0 349 460 | 1/1990 | (EP) . |
| 0 495 505 | 7/1992 | (EP) . |
| 2 233 596 | 1/1991 | (GB) . |
| 2 303 817 | 3/1997 | (GB) . |
| 60-152272 | 8/1985 | (JP) . |
| 61211010 | 9/1986 | (JP) . |
| 03049174 | 3/1991 | (JP) . |
| 5-41257 | * 2/1993 | (JP) . |
| 6-35400 | * 9/1994 | (JP) . |

* cited by examiner

Primary Examiner—Karl D. Easthom
Assistant Examiner—Kyung S. Lee
(74) Attorney, Agent, or Firm—Anthony J. Casella; Gerald E. Hespos

(57) ABSTRACT

Male and female connectors are formed to enable easy identification of proper mating pair. Connectors 7a (7b) and 8a (8b) are male and female connectors that are connectable with each other. An error assembling preventing rib 12 and an identification rib 14 which show that connectors 7a (7b) and 8a (8b) are a proper mating pair are provided on the outer surface of the connectors 7a (7b) and 8a (8b). Whether or not the combination of the connectors is proper can be discriminated by seeing and/or touching the ribs 12 and 14. Therefore, the connectors have an excellent function of preventing an error assembling.

5 Claims, 5 Drawing Sheets

MALE AND FEMALE CONNECTOR PAIR AND SET OF MATING CONNECTORS

BACKGROUND OF THE INVENTION

1. Field of the Invention

The present invention relates to a male and female connector pair and to a set of mating connectors comprising a plurality of such male and female connector pairs.

2. Description of the Related Art

Conventional male and female connector pairs are shown in FIG. 6. These pairs comprise two male housings "b" having receptacles "a" and two female housings "c" to be fittable into the receptacles "a". Identification means are provided for permitting the connector housings to be connected with each other only in a proper combination.

This identification means comprises a rib "d" that extends in a direction of connection at a right end position of the upper surface of the female housing "c," as shown on a right side in FIG. 6. The rib "d" is fittable in a receiving groove (not shown) formed in a corresponding position of the inner surface of the receptacle "a" of the male housing "b" with which the female housing "c" is to be connected. The identification means further comprises a rib "e" formed in a left end position of the upper surface of the female housing "c" as shown in a left side in FIG. 6. The rib "e" is fittable in a receiving groove (not shown) formed in a corresponding position of the inner surface of the receptacle "a" of the male housing "b" with which the female housing "c" is to be connected.

The ribs "d" and "e" and the receiving grooves engage with each other only if a proper combination of male and female housings are connected. On the other hand, a transversely reversed combination of the male and female housings, cannot be connected because the ribs "d" and "e" come into contact with the leading ends of the receptacles "a".

In the above conventional connector, the ribs "d" and "e" are formed on the female housings "c" and the receiving grooves are formed in the male housings "b" to prevent an assembly error. However, only the ribs "d" and "e" of the female housings "c" can be easily identified by seeing or touching the connector housings. The confirmation of the receiving grooves of the male housings is accompanied by a cumbersome operation of looking into the receptacles "a" or inserting a finger thereinto.

Further, under the condition that the connector housings are connected by feeling without seeing them, operability is further reduced since the ribs "d" and "e" need to be searched by the finger tip. Particularly, if the connector housings are so small that the finger cannot be inserted into the receptacles "a", operability is even poorer.

In view of the above problems, an object of the present invention is to improve a function of preventing an error of assembling of male and female connectors.

SUMMARY OF THE INVENTION

According to the invention there is provided a male and female connector pair that are connectable with each other. Identification means are provided on outer surfaces of the both connectors for showing that male and female connectors are a proper mating pair. The provision of the identification means on the outer surfaces of both connectors, enables an easy visual or tactile determination of whether the combination of the connectors is proper. Therefore, the connectors have an excellent function of preventing an assembling error.

According to a preferred embodiment of the invention, the identification means are in the form of a projection and/or a recess so as to be recognizable by touching. Thus, an assembling error can be prevented securely even in the case that the connectors are connected by feeling without seeing the connectors.

Preferably, the identification means comprise an error assembling preventing portion which is formed on the upper surface of one connector to extend in or along a direction of connection of the connectors. The error assembling preventing portion is at least partially engageable with or fittable with or into a receiving portion formed preferably in an inner surface of a receptacle of the other connector into which the one connector is at least partially fittable. The receiving portion is located in a position substantially corresponding to that of the error assembling preventing portion and substantially extending in or along the direction of connection. The error assembling preventing portion may be a projection or a recess and the receiving portion is the other of a projection and a recess.

An identification portion preferably is formed on the upper surface of the other connector, and preferably extends on the same straight line as the error assembling preventing portion of the one connector when the connectors face each other.

A discrimination of whether the combination of the connectors is proper is made by touching the outer surfaces of the connectors and judging whether the error assembling preventing portion of the one connector and the identification portion of the other connector correspond. Preferably this discrimination is made to determine whether the error assembling preventing portion and the identification portion are aligned substantially on the same straight line when the two connectors face each other. The identification means aligned on the same straight line, or otherwise correspond, only if the combination of the two connectors is proper. Thus the connectors can be identified easily.

Further preferably, the identification means is in a form to be only visually identifiable. Most preferably, the identification means is in the form of one or more colors. According to the invention, there is further provided a set of mating connectors, comprising at least two male and female connector pairs which are appropriately connectable with each other. The identification means provided on each male and female connector pair are different.

According to a preferred embodiment of the invention, the error assembling preventing portion and/or the identification portion of each male and female connector pair are positioned in different positions. Preferably the positions are laterally displaced or shifted with respect to each other in a direction at an angle different from 0° or 180° relative to the connection direction.

These and other objects, features and advantages of the present invention will become more apparent upon a reading of the following detailed description and accompanying drawings.

DETAILED DESCRIPTION OF THE PREFERRED EMBODIMENT

Figure 1:
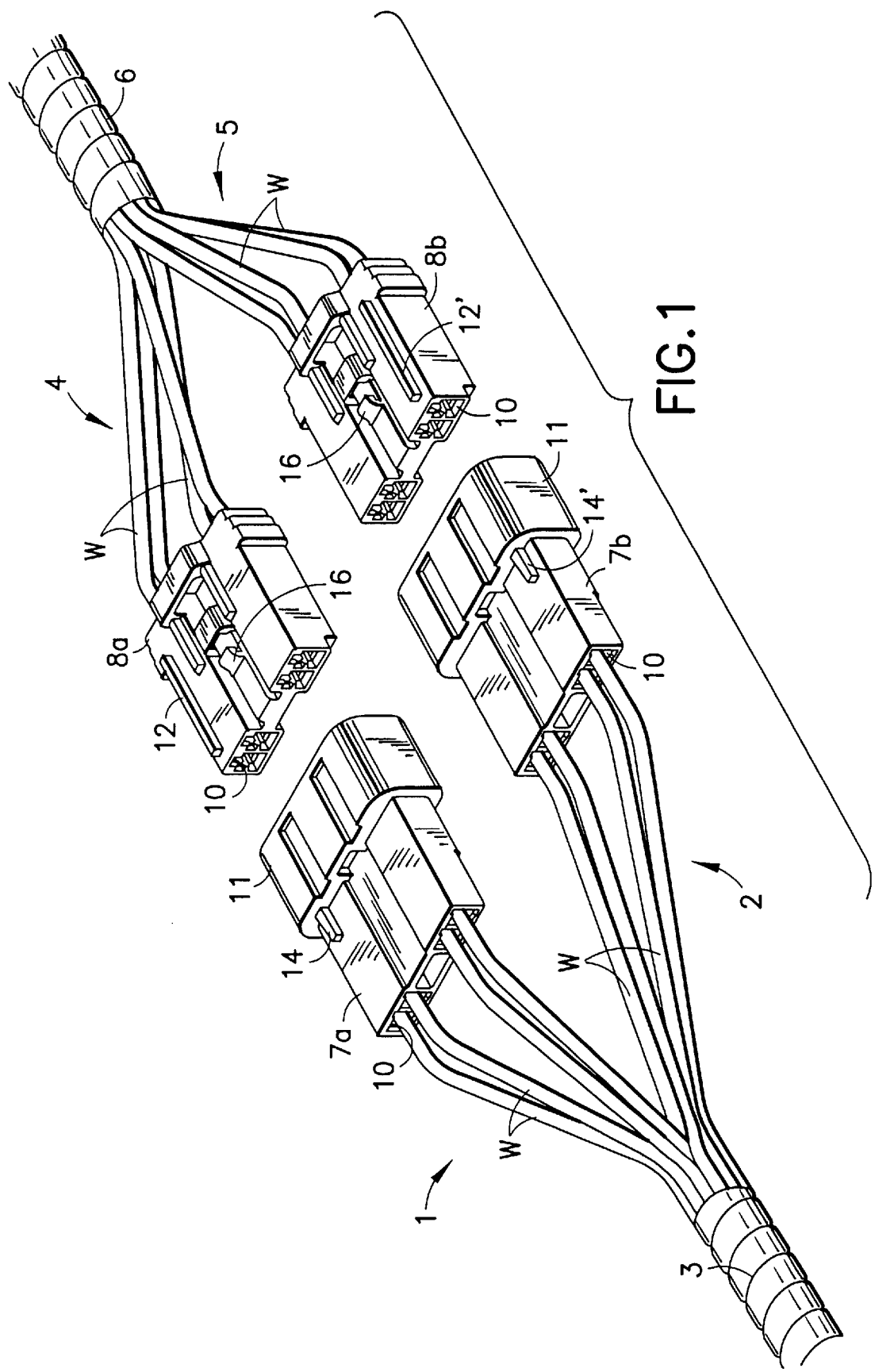
FIG. 1 is a perspective view showing two pairs of male and female connectors according to a first embodiment.

FIG. 1 shows an end of a first wiring harness 3 obtained by bundling a first wire group 1 and a second wire group 2 each of which is comprised of a plurality of wires W. An end of a second wiring harness 6 is obtained by bundling a first wire group 4 and a second wire group 5 each of which also is comprised of a plurality of wires W. First and second male connectors 7a, 7b are connected with an end of the wire group 1 and an end of the wire group 2, respectively. On the other hand, a first female connector 8a is paired with the first male connector 7a and is connected or connectable with an end of the first wire group 4 of the wiring harness 6. A second female connector 8b is paired with the second male connector 7b and is connected or connectable with an end of the second wire group 5.

Figure 2:
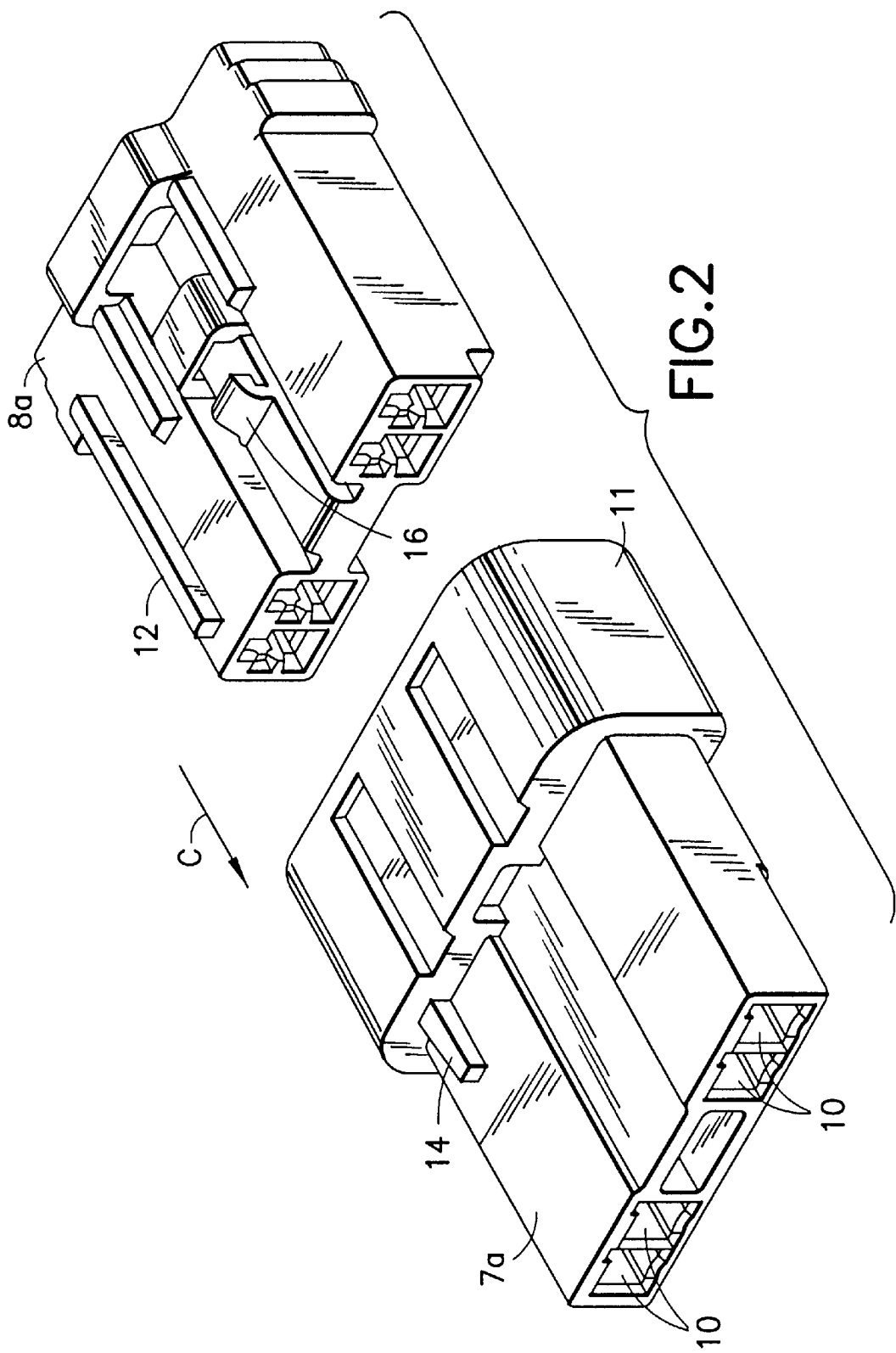
FIG. 2 is a perspective view of one pair of male and female connectors of FIG. 1.
Figure 4:
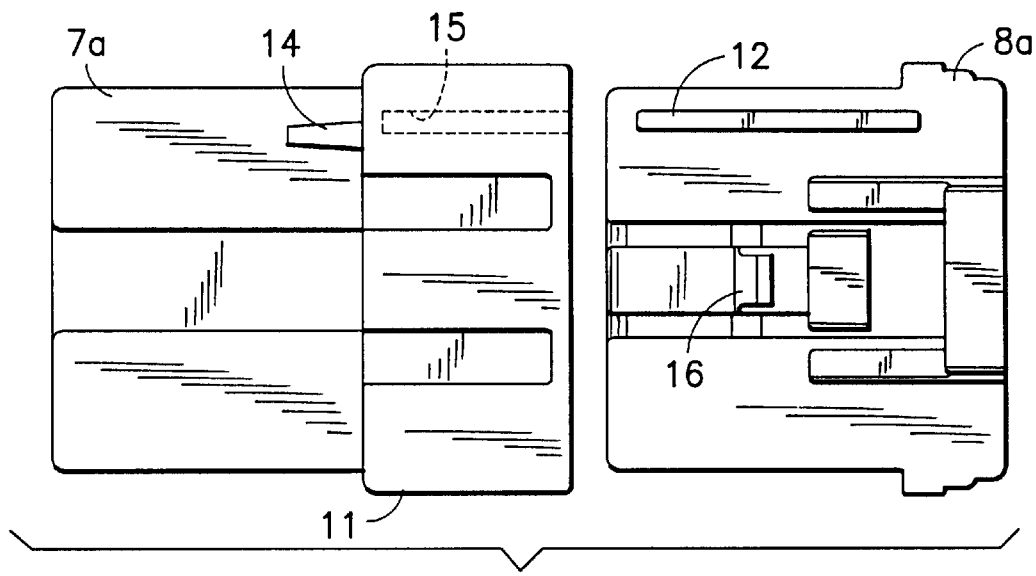
FIG. 4 is a plan view of the one pair of male and female connectors of FIG. 1.

FIGS. 2 and 4 show the mating first male and female connectors 7a and 8a. The first male connector 7a is formed with cavities 10 into which male terminal fittings (not shown) are at least partially insertable. The first male connector 7a also has a receptacle 11 into which a mating or front end portion of the first female connector 8a is at least partially fittable or insertable. The receptacle 11 is formed at the mating or front end of the first male connector 7a. The first female connector 8a is formed with cavities 10 into which female terminal fittings (not shown) connected with the wires W are at least partially insertable. A mating or front end thereof is so shaped as to be substantially closely fittable into the receptacle 11 of the first male connector 7a. Both the male and female terminal fittings may be connected to the wires W before being inserted into the cavities 10.

The upper surface of the first female connector 8a is formed with an error assembling preventing rib 12 which is disposed in a first lateral position, e.g. in a position toward the right end when viewed from behind with respect to a direction C of connection with the first male connector 7a. The first male connector 7a is formed with an identification rib 14 in a position substantially corresponding to that of the error assembling preventing rib 12. The rib 14 extends substantially backward or along the direction C of connection and away from the mating end portion. The rib 14 extends from the base end of the receptacle 11 and is located substantially on the same straight line as the rib 12 or substantially flush with the rib 12 when the first male connector 7a and the first female connector 8a face each other.

The inner surface of the receptacle 11 has a receiving groove 15, as a receiving portion, along which the error assembling preventing rib 12 of the first female connector 8a is at least partially fittable or insertable. The receiving groove 15 extends in the direction C of connection and is formed in a position corresponding to the rib 12. Accordingly, the first male and female connectors 7a and 8a are connectable only when being properly faced to each other as shown in FIGS. 1, 2 and 4.

Further, a locking portion 16 is formed in the middle of the upper surface of the first female connector 8a. The locking portion 16 is engageable with an engaging portion (not shown) formed in the inner surface of the receptacle 11 when the first male and female connectors 7a and 8a are connected completely with each other, thereby locking the connectors 7a and 8a into each other.

Figure 3:
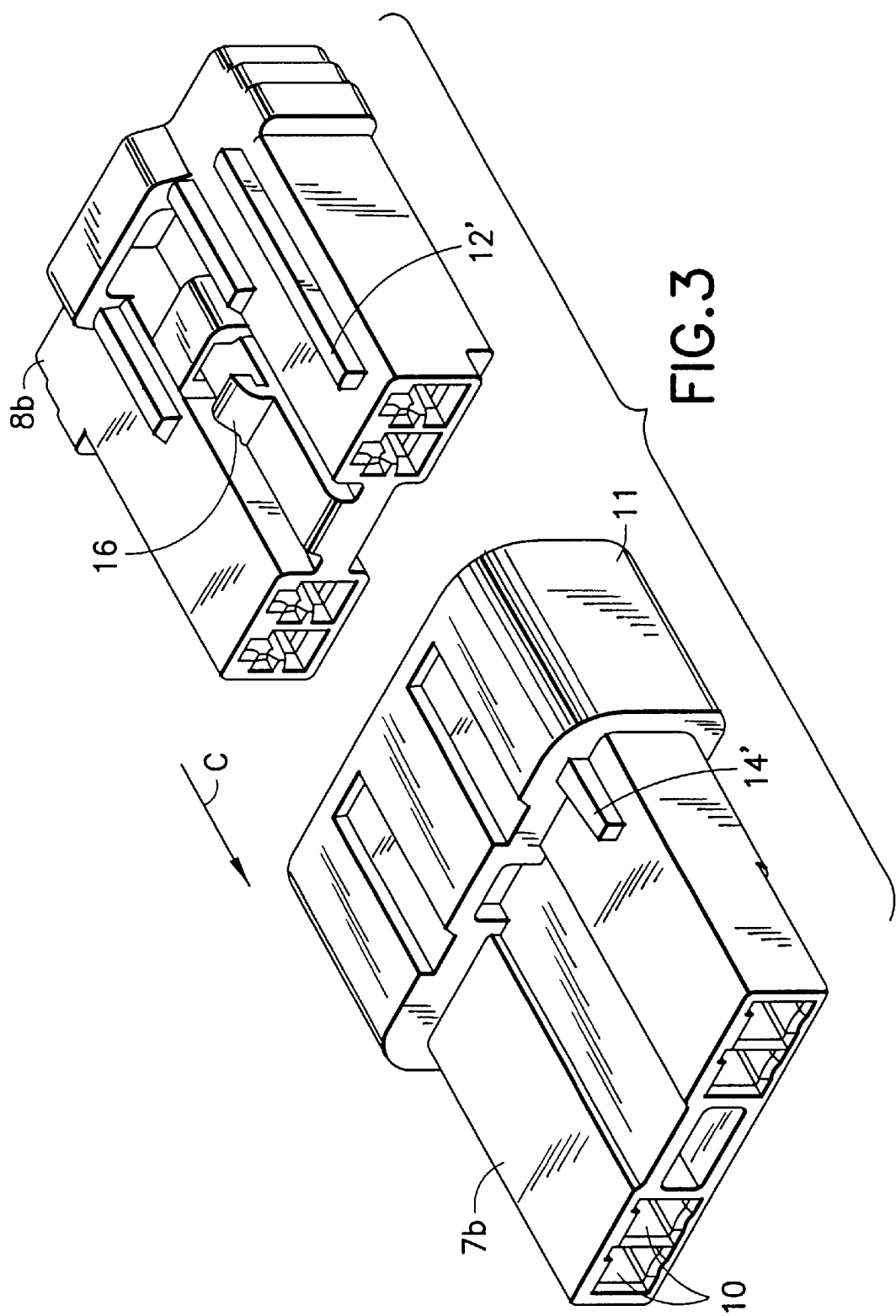
FIG. 3 is a perspective view of the other pair of male and female connectors of FIG. 1.
Figure 5:
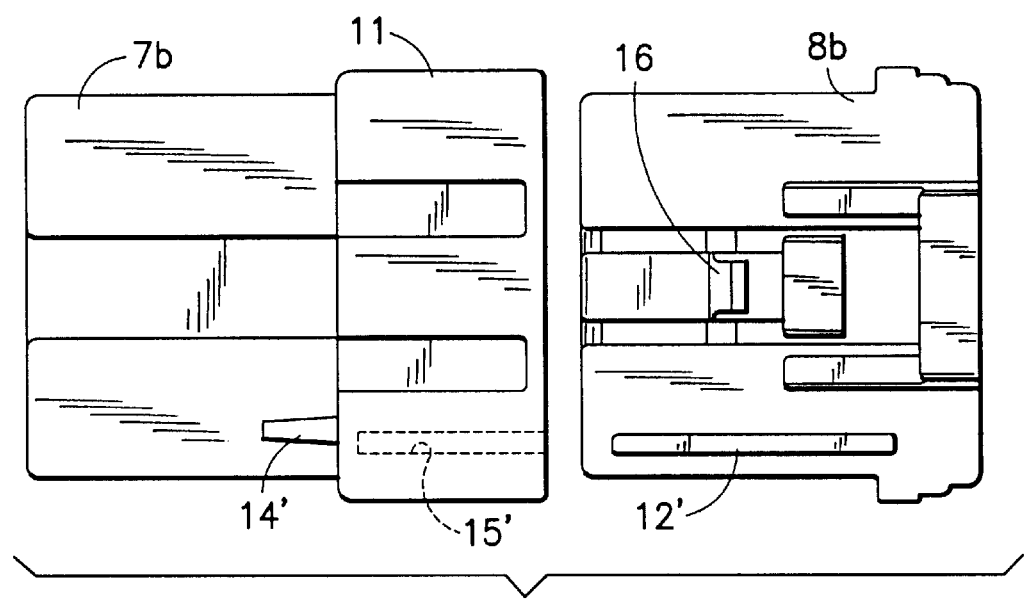
FIG. 5 is a plan view of the other pair of male and female connectors of FIG. 1.
Figure 6:
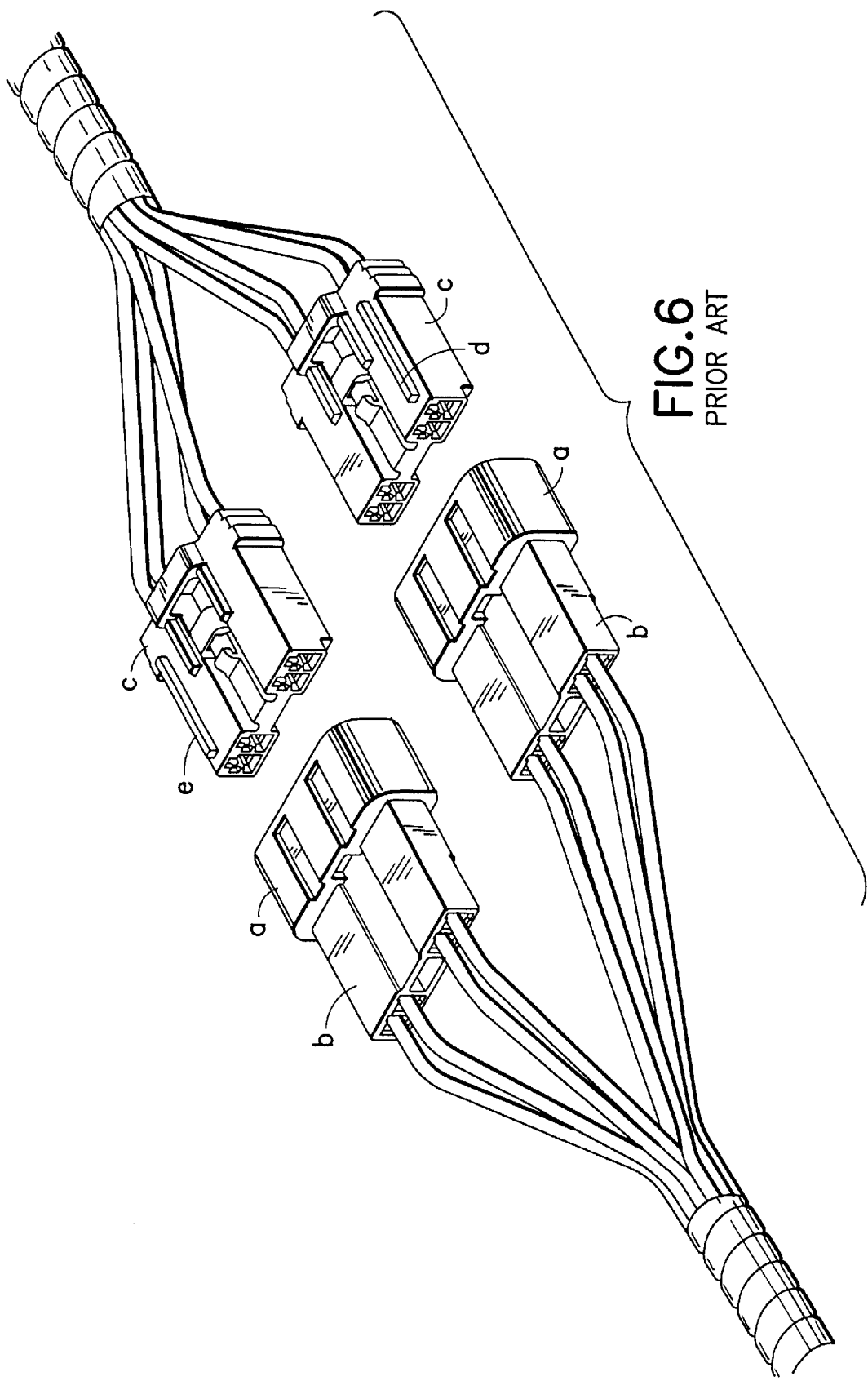
FIG. 6 is a perspective view of two pairs of male and female connectors of prior art.

FIGS. 3 and 5 show the mating second male and female connectors 7b and 8b. The second male and female connectors 7b and 8b have substantially the same constructions as the first male and female connectors 7a and 8a, respectively. Differences lie in the position of the error assembling preventing rib 12' as the error assembling preventing portion, that of the identification rib 14' as the identification portion and that of the receiving groove 15' as the receiving portion.

Specifically, unlike the first female connector 8a in which the error assembling preventing rib 12 is formed at a first lateral side, e.g. at the right side when viewed from behind with respect to the direction C of connection, the rib 12' is formed at a second position, and preferably is spaced in a lateral direction from the first position, e.g. at the left side of the second female connector 8b. The second male connector 7b is formed with the identification rib 14' substantially corresponding to the error assembling preventing rib 12'. The rib 14' extends substantially backward from the base end of the receptacle 11 and is located substantially on the same straight line as or substantially flush with the rib 12' when the second male connector 7b and the first female connector 8b properly face each other.

The inner surface of the receptacle 11 is formed with the receiving groove 15' along which the error assembling preventing rib 12' of the second female connector 8b is at least partially fittable. The receiving groove extends substantially in the direction of connection C and is formed in a position substantially corresponding to the rib 12'. Accordingly, the second male and female connectors 7b and 8b are connectable only when being properly faced to each other as shown in FIGS. 1, 3 and 5.

The male and female connectors according to this embodiment are constructed as above. The discrimination as to whether or not the combination of the connectors is proper can be made by judging whether or not the ribs 12 and 14 or 12' and 14' substantially correspond or are substantially aligned on the same straight line. This judgment can be made easily by seeing and/or touching. Therefore, the connecting operation can be performed easily and quickly even under the condition that the connector housings are connected by feeling without seeing them.

The present invention is not limited to the described and illustrated embodiment but, for example, the following embodiments also are embraced by the technical scope of the present invention as defined in the claims. Besides the following embodiments, a variety of other changes can be made without departing from the scope and spirit of the invention as defined in the claims.

Although the identification means can be identified by both seeing and touching in the foregoing embodiment, they may be only visually identifiable, e.g. by projections and/or recesses being visible e.g. inside an opening or window provided in the connector(s) and/or by the color.

Although the identification means are projections in the foregoing embodiment, it may be a recess or a combination of a projection and a recess according to the invention.

What is claimed is:

1. A male and female connector pair connectable with each other by moving at least one of the pair along a mating direction, said male and female connector pair comprising:
 a female connector having a mating end and a plurality of outer surfaces extending from said mating end an elongated error assembling preventing portion being provided on one of said outer surfaces of the female connector and extending parallel to the mating direction; and a male connector having a mating end and a receptacle configured for receiving at least portions of the female connector, said male connector being formed with an error assembling preventing portion disposed in the receptacle and dimensioned for receiving the error assembling preventing portion of the female connector, the male connector further comprising a plurality of outer surfaces rearwardly of the receptacle, one said outer surface of said male connector being formed with an elongated identification projection extending parallel to the mating direction and aligned with the error assembling preventing portion in the receptacle, the identification projection on the male connector cooperating with the error assembling preventing portion on the female connector for showing that male and female connectors are a proper mating pair, the identification projection being recognizable by touching and extending collinearly with the error assembling preventing portion of the female connector when the mating ends of both said connector s are faced opposite to each other.

2. A set of mating connectors, comprising at least two male and female connector pairs according to claim 1 and being connectable with each other, wherein the error assembling preventing portions on the female connectors are at different respective positions, and wherein the identification projections provided on the male connectors are at different respective positions.

3. A set of mating connectors according to claim 2, wherein the error assembling preventing portion (12; 12') and the identification portion (14, 14') of each male and female connector pair (7a, 8a; 7b, 8b) are in positions laterally displaced with respect to each other.

4. A connector assembly comprising:

first and second female connectors each having an outer surface provided with an error assembling preventing portion, the error assembling preventing portion on the first female connector being at a position displaced from a position defined by the error assembling preventing portion on the second female connector; and first and second male connectors each including a receptacle, the receptacles of the first and second male connectors having outer surfaces and having inner surfaces formed with error assembling preventing portions, the error assembling preventing portion of the first and second male connectors being disposed for engaging the error assembling preventing portion of the respective first and second female connectors in response to insertion of the first and second female connectors into the receptacles of the respective first and second male connectors along a mating direction, the first and second male connectors each further including a rear portion disposed rearwardly of the respective receptacles, the rear portions having rearward outer surfaces defining cross-sections smaller than the outer surfaces of the receptacles, the rearward outer surfaces being provided with an elongated projection extending parallel to the mating direction and being detectable in response to gripping either one of said first and second male connectors, said elongated projection being aligned along the mating direction with the error assembling preventing portion in the respective receptacle, whereby the elongated projections of the first and second male connectors facilitate matching the first and second male connectors with the respective first and second female connectors.

5. A connector assembly comprising:

first and second female connector housings each having an outer surface provided with a tactilely detectable error assembling preventing portion unitarily formed with the respective first and second female connector housings, the error assembling preventing portion on the first female connector housing being at a position displaced from a position defined by the error assembling preventing portion on the second female connector housing; and first and second male connector housings each including a receptacle, the receptacles of the first and second male connector housings having outer surfaces and having inner surfaces formed with error assembling preventing portions, the error assembling preventing portion of the first and second male connector housings being disposed for engaging the error assembling preventing portion of the respective first and second female connector housings in response to insertion of the first and second female connector housings into the receptacles of the respective first and second male connector housings along a mating direction, the first and second male connector housings each further including a rear portion disposed rearwardly of the respective receptacles, the rear portions having rearward outer surfaces defining cross-sections smaller than the outer surfaces of the receptacles, each said rearward outer surfaces being formed with a tactilely detectable elongate projection extending parallel to the mating direction, said tactilely detectable elongate projection on the respective first and second male connector housings being aligned along the mating direction with the error assembling preventing portion in the respective receptacle, whereby the tactilely detectable elongate projections of the first and second male connector housings facilitate matching the first and second male connector housings with the respective first and second female connector housings.

* * * * *